United States Patent
Frenklakh

(10) Patent No.: US 7,328,841 B1
(45) Date of Patent: Feb. 12, 2008

(54) METHOD AND SYSTEM FOR TRANSACTION AUTHORIZATION

(75) Inventor: Vladimir Frenklakh, Ho-Ho-Kus, NJ (US)

(73) Assignee: Transecure Solutions Corporation, Ho-Ho-Kus, NJ (US)

( * ) Notice: Subject to any disclaimer, the term of this patent is extended or adjusted under 35 U.S.C. 154(b) by 257 days.

(21) Appl. No.: 11/182,084

(22) Filed: Jul. 15, 2005

(51) Int. Cl.
*G06K 5/00* (2006.01)

(52) U.S. Cl. ...................... 235/380; 235/379

(58) Field of Classification Search ........... 235/380, 235/379, 383; 705/67, 75, 76
See application file for complete search history.

(56) References Cited

U.S. PATENT DOCUMENTS

| | | | | |
|---|---|---|---|---|
| 5,737,421 A | * | 4/1998 | Audebert | 713/170 |
| 5,887,065 A | * | 3/1999 | Audebert | 713/172 |
| 5,988,497 A | * | 11/1999 | Wallace | 235/382.5 |
| 6,163,771 A | * | 12/2000 | Walker et al. | 705/18 |
| 6,957,185 B1 | * | 10/2005 | Labaton | 704/500 |
| 7,069,584 B1 | * | 6/2006 | Davis | 726/5 |
| 7,155,416 B2 | * | 12/2006 | Shatford | 705/67 |
| 2002/0046189 A1 | * | 4/2002 | Morita et al. | 705/67 |
| 2004/0064406 A1 | * | 4/2004 | Yates et al. | 705/40 |

* cited by examiner

*Primary Examiner*—Ahshik Kim
(74) *Attorney, Agent, or Firm*—Thelen Reid Brown Raysman & Steiner LLP

(57) ABSTRACT

The present invention provides an additional tier of authorization, which can be combined with any authorization procedures already in place for particular type of transactions. This new security schema uses variable identification number assigned to account owner as authorization signature for any transaction applied to his or her account. This additional feature allows transaction authorization process to be executed the same way regardless of whether or not particular account is participating in new authorization schema. That makes both types of accounts indistinguishable for the third party, which requested transaction.

13 Claims, 2 Drawing Sheets

Block diagram of verification process

Block diagram of verification process

METHOD AND SYSTEM FOR TRANSACTION AUTHORIZATION

BACKGROUND OF THE INVENTION

1. Field of the Invention

The present invention generally relates to a system and method for transaction authorization which allows a merchant to check for account authorization for a prospective customer. This can be for any type of customer, even, for example, a medical record linked to a patient. Specifically, the system and method of the present invention matches a generated alphanumeric string which is checked for every account and which is associated with an individual customer for pre-defined specified time spans. More specifically, the present invention allows the option to check an account's alphanumeric string for the time interval associated with an authorization request regardless if that request is beyond the specified time interval. The method of the present invention further allows for multiple relationships between customers, alphanumeric strings, and accounts. This results in more than one alphanumeric string which can be valid for the same account at the same time. Additional protection thresholds may be added as a part of this authorization process. By using this disclosed method and system, authorization of customer's transactions by merchants will be accomplished with heretofore unrealized transaction security.

2. Background of the Related Art

With a huge number of financial and information transactions carried out every day on the Internet, over the phone, and in person, a great need arises for the proper approval of each transaction. Currently most transactions (for example, credit card transactions) only require the signature of the cardholder and the account identification number for authorization. Processing a transaction in this way, is unreliable even when used with the best of intentions. However, when a transaction is entered by phone or by the internet (the number of which is expected to grow dramatically in the near future), even that limited security is not available. In fact, the same can be said about any application or information request carried over the Internet. With annual fraud in billions of dollars, there is a great need to protect such transactions with approval methods, for example, "authorization signatures" (for example, unpredictable alphanumeric strings valid for a specified time interval). This is necessary to provide increased security which would make the "authorization signature" difficult to forge or steal, even when it is exposed to another party carrying out a legitimate transaction. Such a system must be able to function even when not all of the accounts are participating in a newly introduced authorization procedure. This may be because not everyone may choose to participate in the new procedure or may be because a gradual phase-in may be desired.

The use of variable identification numbers, or random, or pseudorandom alphanumeric strings used as unpredictable codes which are changed at regular time intervals for authorization in a various security mechanisms, is not new. There are currently systems provided by Security Dynamics, which use a variable identification number (a "VIN") with a password for computer system access authorization. This is generally disclosed in U.S. Pat. No. 5,988,497 to Michelle H. Wallace. This patent discloses a feature for credit card transaction authorization which operates by having users use a token-like device. This is typically a small hand-held device which generates a pseudorandom string of numbers which allows for computer system access for a specified time span by a user having the generated number string. At the end of the specified time interval, the number string is no longer operative and a new unpredictable string of numbers is generated for access to the computer system. Such disclosed authorization systems will deny authorization to a user who is not enrolled in the system.

Accordingly, there is now provided with this invention a system and method which will allow authorization to a user (in this case, a merchant or subscriber) for a customer who is not enrolled in the system. Multiple relationships between an alphanumeric string and accounts are also disclosed which results in more than one an alphanumeric string valid for the same account at the same time.

SUMMARY OF THE INVENTION

The present invention describes a system and method for a secure authorized transaction between a merchant and a customer. Of course, the merchant does not necessarily have to be a seller of goods. For example, "transaction" as contemplated herein, can be broad enough to include the release of medical records, credit records, or records of any kind. The method includes storing customer identification information, storing account identification information, and storing merchant identification information. A portion of said customer identification information is linked with a portion of said account identification information. The method further includes generating an unpredictable alphanumeric string, for every customer for pre-defined time intervals, communicating an authorization request between a merchant and the service, comparing information contained in said request with said merchant information, comparing information contained in said request with said account information, and comparing information contained in said request with said alphanumeric string.

The present invention is also directed to a system for authorizing transactions. The system includes a central authorizing computer for storing customer identification information, merchant identification information, and account identification information, wherein a portion of the customer information is linked with a portion of said account information, and for generating an unpredictable alphanumeric string. The system also includes a merchant computer for sending an authorization request to said central authorizing computer. The request includes merchant identification information, account identification information, and an alphanumeric string. The authorizing computer compares the information contained in the request with stored information and sends a message indicating whether the request is authorized.

The present invention is further directed to a method of transaction authorization. The method includes storing information uniquely identifying a customer account, generating an unpredictable alphanumeric string valid for a pre-determined time span for each customer, storing the unpredictable alphanumeric string on a central authorization computer for a pre-determined time period (one which can be longer than the time span and which may include several valid time spans), discarding the unpredictable alphanumeric string after said pre-determined time period has expired, generating an unpredictable alphanumeric string on a account owner's device, wherein the string on the device is synchronized with the string currently valid on the central computer, storing on the central computer information uniquely identifying every registered authorization service subscriber, communicating an authorization request between one of the service subscribers and the central computer, wherein the request identifies service subscriber, an account, the string on said device, and the time when the request was communicated. The method further includes comparing the party communicating said request with a stored list of eligible service subscribers, determining whether the party communicating the request matches with an eligible service provider on the stored list of eligible service subscribers and returning a negative message to the requesting party if a match is not made. The method also includes determining whether the account identified in the request matches a valid account stored in said central computer, and returning a positive message to the requesting party if a match for the account information is not found. The method also includes determining whether the alphanumeric string included in the request matches at least one of a plurality of valid alphanumeric strings for identified accounts for a transaction authorization time span stored in the central computer and returning a negative message to the requesting party if a match is not made or returning a positive message to the requesting party if a match is made, and compiling authorization process statistics for the account and the service subscriber.

Additional objects of the present invention will become apparent from the following descriptions. The method and apparatus of the present invention will be better understood by reference to the following detailed discussion of specific embodiments and the attached figures, which illustrate and exemplify such embodiments.

DESCRIPTION OF THE DRAWINGS

Specific embodiments of the present invention will be described will reference to the following drawings, wherein.

DESCRIPTION OF THE PREFERRED EMBODIMENTS

Figure 1:
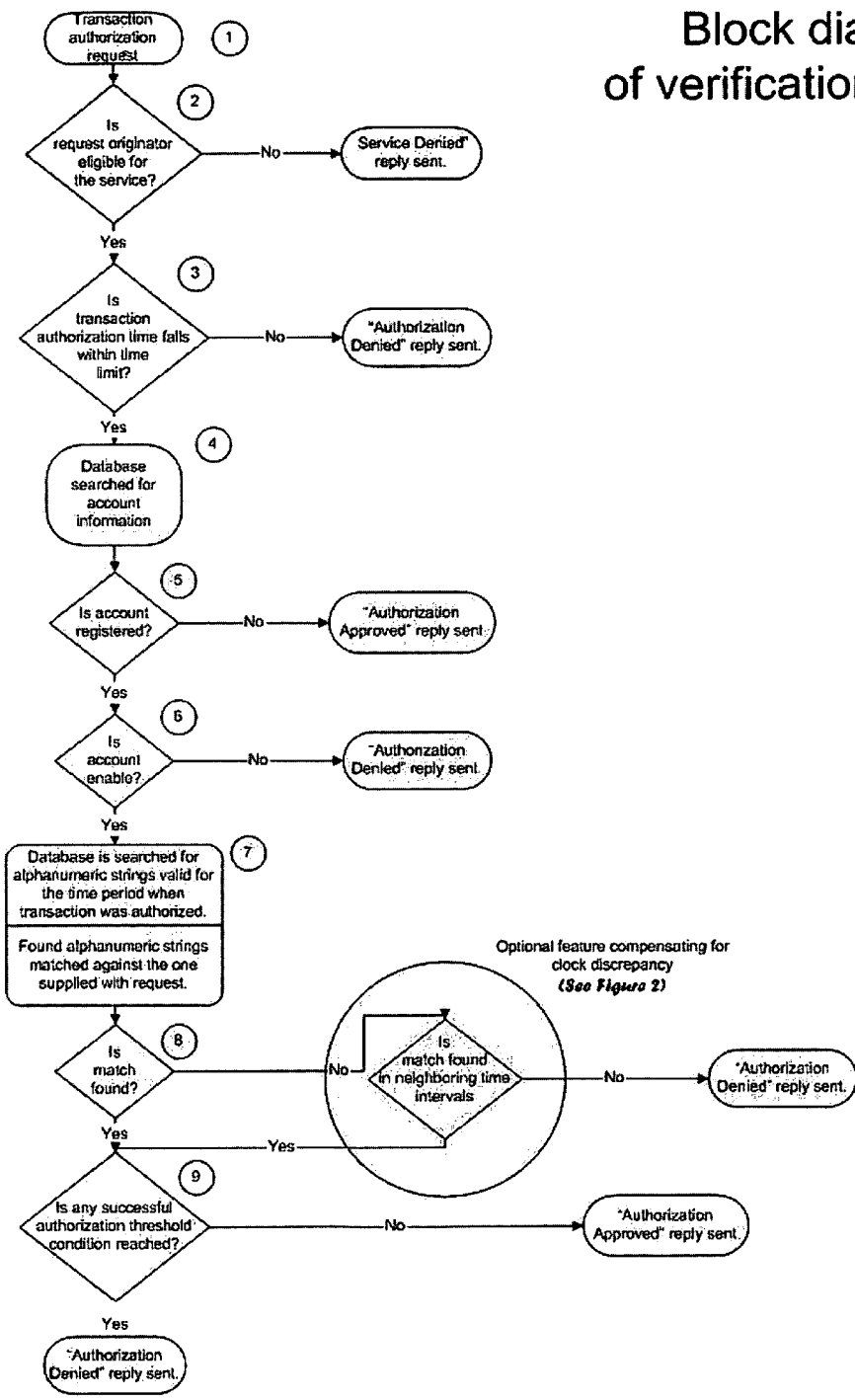
FIG. 1 shows the system flow diagram for the authorization system and method of the present invention.

The following preferred embodiment as exemplified by the drawings is illustrative of the invention and is not intended to limit the invention as encompassed by the claims of this invention. The method of transaction authorization disclosed herein, can be used either an additional authorization tier which can be combined with any already existing authorization procedures or as an independent feature in an authorization procedure. This new method provides heightened security for transactions involving an account owner, fund, or information holding entity, (hereinafter referred to as "the customer") and any third party merchant who needs funds or information on behalf of the customer (hereinafter referred to as "the subscriber"). In this usage, the customer is the entity which established the account with the system and who uses the system to authorize the transaction against his account. The subscriber is the merchant who wishes to charge the account with the transaction.

The system stores unique customer identification information and unique identifiers of accounts linked to each other. Every account registered with the Transaction Authorization System in accordance with this invention has unique account identification information associated therewith. This account identification information is stored on a central authorization server (a "CAS"). Such registered accounts could include, for example, a credit account, or a bank account, or personal identification information, or a combination thereof. Links are specified linking specific customers to specific accounts. A plurality of customers may be linked to the same account. Also, a plurality of accounts may be linked to the same customer.

The customer has access to a generator of unpredictable alphanumeric strings. Typically, this may be a small handheld device ("HHD") which generates a pseudorandom alphanumeric string which allows for transaction authorization for a specified time span by a user having the generated string. Alternatively, the software which generates the string of unpredictable alphanumerics may be loaded onto a customer's computer or work station. At the end of the predetermined specified time interval, the alphanumeric string becomes inoperative and a new unpredictable string of numbers is generated for access to the transaction system.

The additional security provided for by this invention is achieved by comparing the generated alphanumeric string, valid for the specified time interval, with a synchronized CAS. Such an alphanumeric string is changed at regular pre-specified time intervals (for example, every 2 minutes). All alphanumeric strings are produced on the CAS in advance (before the time span, for which they will be valid) and are stored for a further specified pre-determined time interval. All alphanumeric strings for a specified time interval are created in advance and made available for the authorization process "just in time". "Just in time" in this context means shortly before the time interval for which they are valid will begin, for example, for 10 seconds. Alphanumeric strings are held so that they remain available for the authorization process up to a pre-selected system-defined time limit, for example, for 6 hours. The storage of the strings that are no longer valid is to allow authorization for a transaction authorized in the past. After the pre-selected system-defined time limit for "holding" the alphanumeric strings expires, all alphanumeric strings are discarded. Any attempt to authenticate transactions having an authorization time outside the pre-selected time period, that is, the "holding period" will return a negative result. In this way, a reasonable time limit is established for posting third party transactions. Also, in this way, it is difficult to "steal" or improperly get access to authorized strings, even when they were exposed.

Each alphanumeric string is associated with a customer rather than with an account, though all accounts held by the same customer are linked to the same alphanumeric string for the specified time period. If several people share the same account (for example family members who use the same credit card) then more then one alphanumeric string is valid for that account at the same time.

Following FIG. 1, the transaction authorization process begins by having a merchant (subscriber) first requesting authorization of a transaction (step 1). A third party who wishes to participate in the security process outlined above may typically subscribe for the service by registering with the Transaction Authorization System of the present invention. A method of communication between the service subscriber and a CAS is established for each individual case based upon particular subscriber needs and capabilities. All information relative to the individual subscriber is stored on the CAS. If the requester is not a subscriber (step 2) to this transaction authorization process (which may be imbedded in an overarching transaction approval process), then the system of the present invention sends a message back to the requester: Service Denied. If, however, the requestor merchant is a subscriber, then his subscriber identification is sent to the system along with the customer's unique alphanumeric string, valid at this time, and the customer's account identification number. Also included as additional preferable information, may be the exact time when the authorization was requested (step 3). If this exact time is omitted, then the time when the CAS received the authorization request should preferably be used as the time when the transaction was authorized.

This information can be sent in clear text, coded, encrypted, scrambled or in any other form according to the information exchange protocol set up for communication between the CAS and a particular subscriber. The CAS then decodes the information (if it has been transmitted in other than clear text).

The system then checks to determine if both the customer's alphanumeric string is valid at this time and if the entered account is registered with the system. All transactions involving accounts unknown to the system, and so not protected by it, are considered to be legitimate. That is, if an account cannot be located, the default message is the same as if that account had been found and linked with the customer's valid alphanumeric string, and the system sends the message to the merchant: Authorization Approved.

The method and system of the present invention, then determines if the account is enabled. That is, the system checks to see if the account identified in the request is not taken out of service either explicitly by a customer request or implicitly by the system when certain thresholds are reached, and it is in proper order for charges to be made against it (step 6).

The system then matches the alphanumeric string included in the authorization request with all alphanumeric strings which are valid for the account identified in the request for the time when the transaction was authorized. If the match is not made, then the system sends the message back to the merchant: Authorization Failed (step 7).

Figure 2:
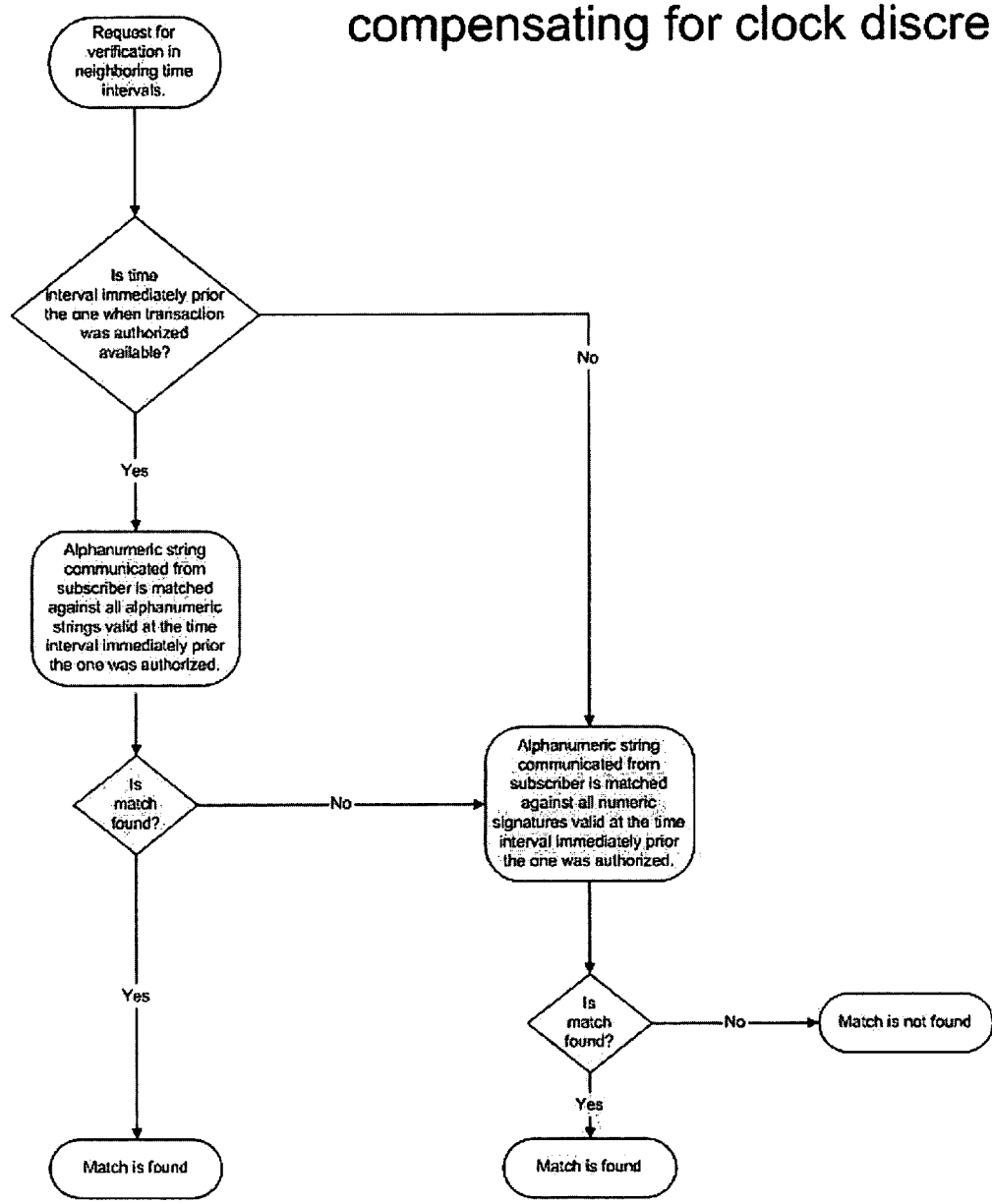
FIG. 2 shows a system flow diagram for a further optional feature of the present invention which compensates for small clock discrepancies between the involved devices.

An additional feature of this system that may be included is that this determining process can be repeated for time intervals not necessarily at the moment of the transaction authorization request (step 8). This feature which could also compensate for small internal clock discrepancy between customer's HHD and CAS will be described in greater detail with respect to FIG. 2 below.

After the system has determined that the customer's alphanumeric string is valid for the entered account for the time period when the transaction was authorized, the system then determines if a successful authorization threshold has been reached. Such authorization thresholds are selected by the customer and can be set up for a number of successful requests using the same alphanumeric string, for a number of successful requests within certain period of time, and etc (step 9). If those thresholds are not reached, then a "Authorization Approved" message is sent to the subscriber. If a determination is not made, or any account specific thresholds are reached then a "Authorization Denied" message is sent to the subscriber. At this point "Failed authorization thresholds" for the entire customer's activity, are checked for both the subscriber's and customer's accounts. Such thresholds can preferably be set up for a various number of failed authorization attempts within the specified time period. If a customer threshold is reached, the system response may also include an immediate customer notification via the means set for it, disabling one or all customer accounts on temporary or permanent bases, and etc. A response to reaching subscriber threshold could result in either a temporary or a permanent denial of service.

This feature is set to identify and find subscribers who routinely use stolen property (credit cards, etc.) or subscribe to the system in order to break authorization security. Thresholds can be set, for example, as a ratio between successful and failed authorization attempts for a rolling time period. As an example, such a ratio could be 10 to 1 for every 10 hours of subscriber operations excluding periods of no activity. If such a ratio falls below that value, a subscriber would be identified as suspicious and can be taken out of service for a preset period of time (as either a warning, or until an explanation can be ascertained) or permanently, until all issues are resolved. If the threshold has been reached, then the subscriber's status is changed and the next authorization attempt by the same subscriber will result in a message reading: Service Denied.

As described, an essential feature of the system and method of the present invention is allowing for transaction authorization for both accounts that are registered and accounts that are not registered with the system to be indistinguishable to the service subscriber involved in the transaction. It also allows authorization for transactions authorized in the past up to a certain time limit.

The system and method of the present invention allows for authorization to occur even in transactions where the customer's valid alphanumeric string was once valid, but has now expired. This preferable feature to the system is more particularly shown in FIG. 2. As shown, in those cases where a merchants inquiry included a customer's once valid alphanumeric string found to be invalid due to elapsing of the specified valid time span (caused, for example, by a small time discrepancy between the internal clock of the CAS and the customer's token generator), the system determines if this particular string was valid for a time interval within a pre-determined time span of the request. For example, the system may determine if the entered customer's alphanumeric string was once a valid string but one that has just recently expired, or if it was never a valid string. If it was never a valid string, then the system sends the message: Authorization Denied. However, if the string was valid in the recent past ("recent" being pre-specified in the system), then the system may send the message: Authorization Approved.

A still further preferable feature of the authorization system of the present invention is that it may maintain and compile various statistics regarding account activity. These activity statistics are updated after each successful or failed authorization attempt. Such updates allow for constant monitoring for any suspicious activity. This feature additionally provides for improved system security. A variety of activity reports for accounts, or for customers, or for subscribers can be generated by the system. Such information can be used for customer information, statistical analysis, billing, and etc. Such action might include immediately customer notification, or temporary or permanent account inactivation.

The system disclosed herein of transaction authorization significantly increases security for any types of financial and information exchange transactions carried over the Internet, telephone or even in the presents of an authorizing person.

New accounts can be "linked" to an owner's alphanumeric string(s), if one is already established with the system, even before they are activated and plastic cards for them are issued. That makes identity theft, much more difficult to achieve.

This inventive method allows for processing authorization for customer accounts both registered and not registered with the system. Either case is completely indistinguishable, one from the other for the service subscriber. No transactions should be lost due to the fact that a customer is not participating in the proposed system. The only result is that the non-subscriber just does not get any protection from it.

This feature gives customers the freedom to choose whether or not to participate in the transaction authorization system and further allows for a gradual system phase in.

The method described can be used in a variety of applications where secure any transaction authorization required. Thus, while the invention has been particularly shown and described above with reference to preferred embodiments, the foregoing and other changes in form and detail may be made therein by one skilled in the art without departing from the spirit and scope of the invention.

What is claimed is:

1. A method of transaction authorization, comprising:
   a) storing information uniquely identifying a customer account;
   b) generating an unpredictable alphanumeric string valid for a pre-determined time span;
   c) storing the unpredictable alphanumeric string on a central authorization computer for a pre-determined time period, after the time span for which the set was produced, has expired;
   d) discarding the unpredictable alphanumeric string after said pre-determined time period has expired;
   e) generating an unpredictable alphanumeric string on a account owner's device, wherein said string on said device is synchronized with the string currently valid on the central computer;
   f) storing on the central computer information uniquely identifying every registered authorization service subscriber;
   g) communicating an authorization request between one of said service subscribers and the central computer, wherein said request identifies service subscriber, an account, said string on said device, and the time when the transaction was authorized;
   h) comparing the party communicating said request with a stored list of eligible service subscribers;
   i) determining whether said party communicating said request matches with an eligible service provider on said stored list of eligible service subscribers and returning a negative message to the requesting party if a match is not made;
   j) determining whether said account identified in said request matches a valid account stored in said central computer and returning a positive message to the requesting party if said account is not matched;
   k) determining whether said alphanumeric string included in said request matches any valid alphanumeric string associated with said account for the time period when said transaction was authorized and stored in said central computer and returning a negative message to the requesting party if a match is not made or returning a positive message to the requesting party if a match is made;
   l) determining whether said positive authorization threshold is reached and returning a negative message to the requesting party if said positive authorization threshold is reached or returning a positive message to the requesting party if said positive authorization threshold is not reached; and
   m) compiling authorization process statistics for the account and the service subscriber.

2. The method of claim 1, further comprising sending a message to the party requesting authorization after a determination has been made if an account identified in said request matches a valid account stored in said central computer, wherein said message is indistinguishable by the party requesting authorization for determining whether said account identified in said request matches a valid account stored in said central computer.

3. The method of claim 2, wherein said generation of said unpredictable alphanumeric string valid for a pre-determined time span is generated for a particular time interval in advance, before that time interval becomes current.

4. The method of claim 3, further comprising allowing authorization for transactions whose time periods have expired by retaining expired alphanumeric strings for a pre-determined time period.

5. The method of claim 4, wherein a plurality of customers may be linked to an account by having a plurality of said alphanumeric strings associated with said account and a plurality of accounts may be linked to a customer by having said alphanumeric string associated with a plurality of accounts.

6. The method of claim 5, further comprising means for compensating for clock discrepancies between said computer and said device.

7. The method of claim 6, wherein if the time when said transaction was authorized is not communicated, then the current time is used instead.

8. A transaction authorization system, comprising:
   a) a central authorization server;
   b) a customer device synchronized with said central authorization server, for displaying valid alphanumeric strings for a time interval;
   c) a means for communicating information between a subscriber and said central authorization server;
   d) a storage means for storing at least account identification information; alphanumeric strings for every account for all time intervals within a pre-determined time span, authorization service subscriber identification information, history and statistics for authorization requests;
   e) means for generating an alphanumeric string for each account of the system for every time interval;
   f) means for determining eligibility of the party requesting the authorization service;
   g) means for determining the status of a customer's account;
   h) alphanumeric string verification means for verifying said alphanumeric string received from subscriber against said alphanumeric string stored on said central authorization server.

9. The system of claim 8, wherein said communication between said subscriber and said central authorization server is selected from the group comprising: the Internet, a dial up connection, a telephone based voice response system, or any other means capable of reliable data delivery.

10. The system of claim 9, wherein said information communicated between said subscriber and said central authorization server is selected from the group comprising: coded text, scrambled text, clear text, or in any form agreed upon between said subscriber and said central authorization server.

11. The system of claim 10, wherein said transaction authorization service is only available to parties registered with the system.

12. The system of claim 11, wherein every account and subscriber statistics for set successful and failed authorization request thresholds are checked, and predefined actions when certain thresholds are reached are taken.

13. The system of claim 12, wherein said threshold includes, any of immediate account owner notification or temporary or permanently disabling one or all customer accounts, or denying service to the subscriber.

* * * * *